US012694443B2

(12) United States Patent
Kumar et al.

(10) Patent No.: US 12,694,443 B2
(45) Date of Patent: Jul. 28, 2026

(54) SYSTEM AND METHOD FOR SELECTING ENTITIES

(71) Applicant: Jio Platforms Limited, Ahmedabad (IN)

(72) Inventors: Akansha Kumar, Chandanagar (IN); Ameya Munagekar, Mumbai (IN); Robin Ajmera, Bhilwara (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 325 days.

(21) Appl. No.: 18/172,402

(22) Filed: Feb. 22, 2023

(65) Prior Publication Data

US 2023/0267535 A1 Aug. 24, 2023

(30) Foreign Application Priority Data

Feb. 23, 2022 (IN) ............................ 202221009644

(51) Int. Cl.
*G06Q 30/00* (2023.01)
*G06Q 30/08* (2012.01)

(52) U.S. Cl.
CPC .................................... *G06Q 30/08* (2013.01)

(58) Field of Classification Search
CPC ...................................................... G06Q 30/08
See application file for complete search history.

(56) References Cited

U.S. PATENT DOCUMENTS

| | | | | |
|---|---|---|---|---|
| 8,684,827 | B2 * | 4/2014 | Asher | G06Q 40/04 700/91 |
| 2007/0054718 | A1 * | 3/2007 | Del Prado | A63F 13/792 463/1 |
| 2011/0230243 | A1 * | 9/2011 | Hereford | G07F 17/326 463/1 |
| 2011/0306427 | A1 * | 12/2011 | Pawson | A63F 13/795 463/42 |
| 2014/0274245 | A1 * | 9/2014 | Stickel | A63F 13/65 463/9 |
| 2015/0321105 | A1 * | 11/2015 | Anderson | A63F 13/828 463/42 |
| 2020/0030696 | A1 * | 1/2020 | Groset | A63F 13/79 |
| 2020/0160255 | A1 * | 5/2020 | Douglas | G06Q 10/063118 |

OTHER PUBLICATIONS

Zhao, Haoyu, et al. "Multi-objective optimization for football team member selection." Ieee Access 9 (2021): 90475-90487.*
Maniezzo, Vittorio, and Fabian Andres Aspee Encina. "Predictive analytics for real-time auction bidding support: A case on fantasy football." Operations Research Forum. vol. 3. No. 3. Cham: Springer International Publishing, 2022.*

* cited by examiner

*Primary Examiner* — Kathleen Palavecino
(74) *Attorney, Agent, or Firm* — FINNEGAN, HENDERSON, FARABOW, GARRETT & DUNNER LLP

(57) ABSTRACT

The present disclosure provides a system and method for optimizing a team selection process during an auction. The method includes receiving a first input associated with a quality of a sports team, receiving a second input associated with a success probability of a bid associated with the sports team, and determining an optimized list of players for the sports team based on the first and the second inputs.

7 Claims, 12 Drawing Sheets

200

600

602-1 — INPUT

| | |
|---|---|
| TEAM QUALITY | 0.1 |
| BID SUCCESS | 0.9 |

OUTPUT — 604-1

| ROLE | SLOT | PLAYER | OPTIMAL BID PRICE |
|---|---|---|---|
| R-1 | S1 | P-13 | $2.0 MILLION |
| R-1 | S2 | P-27 | $1.50 MILLION |
| R-2 | S3 | P-18 | $1.0 MILLION |

602-2

| | |
|---|---|
| TEAM QUALITY | 0.5 |
| BID SUCCESS | 0.5 |

604-2

| ROLE | SLOT | PLAYER | OPTIMAL BID PRICE |
|---|---|---|---|
| R-1 | S1 | P-15 | $3.0 MILLION |
| R-1 | S2 | P-27 | $0.8 MILLION |
| R-2 | S3 | P-05 | $1.2 MILLION |

602-3

| | |
|---|---|
| TEAM QUALITY | 0.9 |
| BID SUCCESS | 0.1 |

604-3

| ROLE | SLOT | PLAYER | OPTIMAL BID PRICE |
|---|---|---|---|
| R-1 | S1 | P-15 | $2.0 MILLION |
| R-1 | S2 | P-07 | $2.1 MILLION |
| R-2 | S3 | P-05 | $1.2 MILLION |

620

FIXED PLAYERS

| ROLE | SLOT | PLAYER | OPTIMAL BID PRICE |
|---|---|---|---|
| TBD | TBD | P-17 | TBD |
| TBD | TBD | P-11 | TBD |
| TBD | TBD | P-05 | TBD |
| TBD | TBD | TBD | TBD |
| TBD | TBD | TBD | TBD |
| TBD | TBD | TBD | TBD |
| --- | --- | --- | --- |
| TBD | TBD | TBD | TBD |

| | |
|---|---|
| TEAM QUALITY | INPUT |
| BID SUCCESS | INPUT |

FIG. 6C

630

FIXED PLAYERS AND CORRESPONDING BID PRICE

| ROLE | SLOT | PLAYER | OPTIMAL BID PRICE |
|---|---|---|---|
| TBD | TBD | P-17 | $0.5 MILLION |
| TBD | TBD | P-11 | $1 MILLION |
| TBD | TBD | P-05 | $0.7 MILLION |
| TBD | TBD | TBD | TBD |
| TBD | TBD | TBD | TBD |
| TBD | TBD | TBD | TBD |
| --- | --- | --- | --- |
| TBD | TBD | TBD | TBD |

| | |
|---|---|
| TEAM QUALITY | INPUT |
| BID SUCCESS | INPUT |

FIG. 6D

640

Fixed Players, Corresponding Bid Price And Slot

| Role | Slot | Player | Optimal Bid Price |
|---|---|---|---|
| TBD | S-1 | P-17 | $0.5 Million |
| TBD | S-2 | P-11 | $1 Million |
| TBD | S-3 | P-05 | $0.7 Million |
| TBD | TBD | TBD | TBD |
| TBD | TBD | TBD | TBD |
| TBD | TBD | TBD | TBD |
| --- | --- | --- | --- |
| TBD | TBD | TBD | TBD |

| | |
|---|---|
| Team Quality | Input |
| Bid Success | Input |

FIG. 6E

SYSTEM AND METHOD FOR SELECTING ENTITIES

RESERVATION OF RIGHTS

A portion of the disclosure of this patent document contains material which is subject to intellectual property rights such as, but are not limited to, copyright, design, trademark, integrated circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to the field of computer integrated telecommunications and more particularly to a system and method employing an intelligent auctioning architecture.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Computerized auction systems have become increasingly popular tools for organizations and individuals to exchange products and services. The growth in the popularity of computerized auction systems can be attributed to the fact that a large number of auction participants, namely offerors and bidders, can gain access to vast global markets via networks. The numerous auction systems operating on these networks offer bidders a convenient way to search, view and acquire a seemingly endless range of products and services. In sports, a conventional player evaluation system uses historical data to predict player performance through the end of the season using a blending function. The system is also applied in a draft context by assigning average performance values to the slots on the owner's team that have not yet been filled with players yet to be drafted. In calculating team points, one version weighs certain statistics more heavily than others.

Conventional recommendation engines are also known in the art. In one conventional recommendation engine, player analyzing software queries a sports statistics system to analyze the relevant players and delivers the analysis to a roster move recommending software component that delivers to the user roster move recommendations based on the results of the player analysis. The player analysis may be based on actual statistics or projected statistics.

Some sports owners, when participating in an auction-style draft, will compute players' auction values before the draft and then approximate the necessary adjustments as the draft goes along. However, this requires that the owners perform many manual calculations with regard to the entire pool of available players. This is often very time-consuming and may result in poor decisions, particularly when a player is overlooked but would otherwise be optimal to be nominated.

There is, therefore, a need in the art to provide a system and a method that can facilitate mitigating the problems associated with the prior art.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for selecting entities. The system includes one or more processors and a memory operatively coupled to the one or more processors, where the memory includes processor-executable instructions, which on execution, cause the one or more processors to receive a first input associated with a quality of a group associated with a sport, receive a second input associated with a success probability of a bid associated with the group, determine an optimized list of entities to form the group based on the first and the second inputs, and select the entities based on the optimized list to play the sport. In some embodiments, the optimized list of entities is determined based on one or more conditions, wherein the entities include at least one of human, robot, and humanoids. The one or more conditions include at least one of a budget, a maximum number of the entities for a role, and a maximum number of different types of the entities.

In some embodiments, the optimized list of entities is determined based on at least one of a team quality weight, a bid success weight, a list of pre-included entities, bid prices for the pre-included entities, and a slot or a role associated with the pre-included entities. Further, the optimized list of entities forming the group includes the list of pre-included entities, wherein the optimized list of entities is displayed on a user interface (UI).

In another aspect of the present disclosure, a method for selecting entities is disclosed. The method includes defining, by a processor, a plurality of sets of attributes associated with one or more entities forming a group associated with a sport, calculating, by the processor, a fitness score associated with the plurality of sets of attributes associated with the one or more entities, selecting, by the processor, at least two sets of the plurality of sets of attributes based on the calculated fitness score, constructing, by the processor, one or more new sets of attributes based on the selected at least two sets of attributes, changing, by the processor, one or more attributes in the one or more new sets of attributes to generate the optimized list of entities. In some embodiments, the method includes selecting, by the processor, the one or more entities to form the group based on the generated optimized list.

In one another aspect of the present disclosure, a user equipment (UE) for selecting entities is disclosed. The UE includes one or more processors and a memory operatively coupled to the one or more processors, wherein the memory includes processor-executable instructions, which on execution, cause the one or more processors to transmit a first set of data including a set of attributes associated with an entity forming a group associated with a sport to an optimizer system and receive an optimized list of entities for the group from the optimizer system, wherein the optimized list is based on the first set of data and a second set of data, and wherein the second set of data is another set of attributes pertaining to a probability of a bid success.

OBJECTS OF THE PRESENT DISCLOSURE

Some of the objects of the present disclosure, which at least one embodiment herein satisfies are as listed herein below.

It is an object of the present disclosure to provide for a system that helps to take informed decisions using the various parameters mentioned.

It is an object of the present disclosure to provide for a system solving a multi objective problem of improving team quality and a bid success probability.

It is an object of the present disclosure to provide for a system that facilitate good solutions quickly which is often crucial in the auction process.

It is an object of the present disclosure to provide for a decision maker that can have multiple scenario simulations and thus can be prepared for a wide range of possibilities arising in the auction process.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 6A-6E illustrate implementations and scenarios of exemplary genetic algorithm (GA), in accordance with embodiments of the present disclosure.

Figure 1:
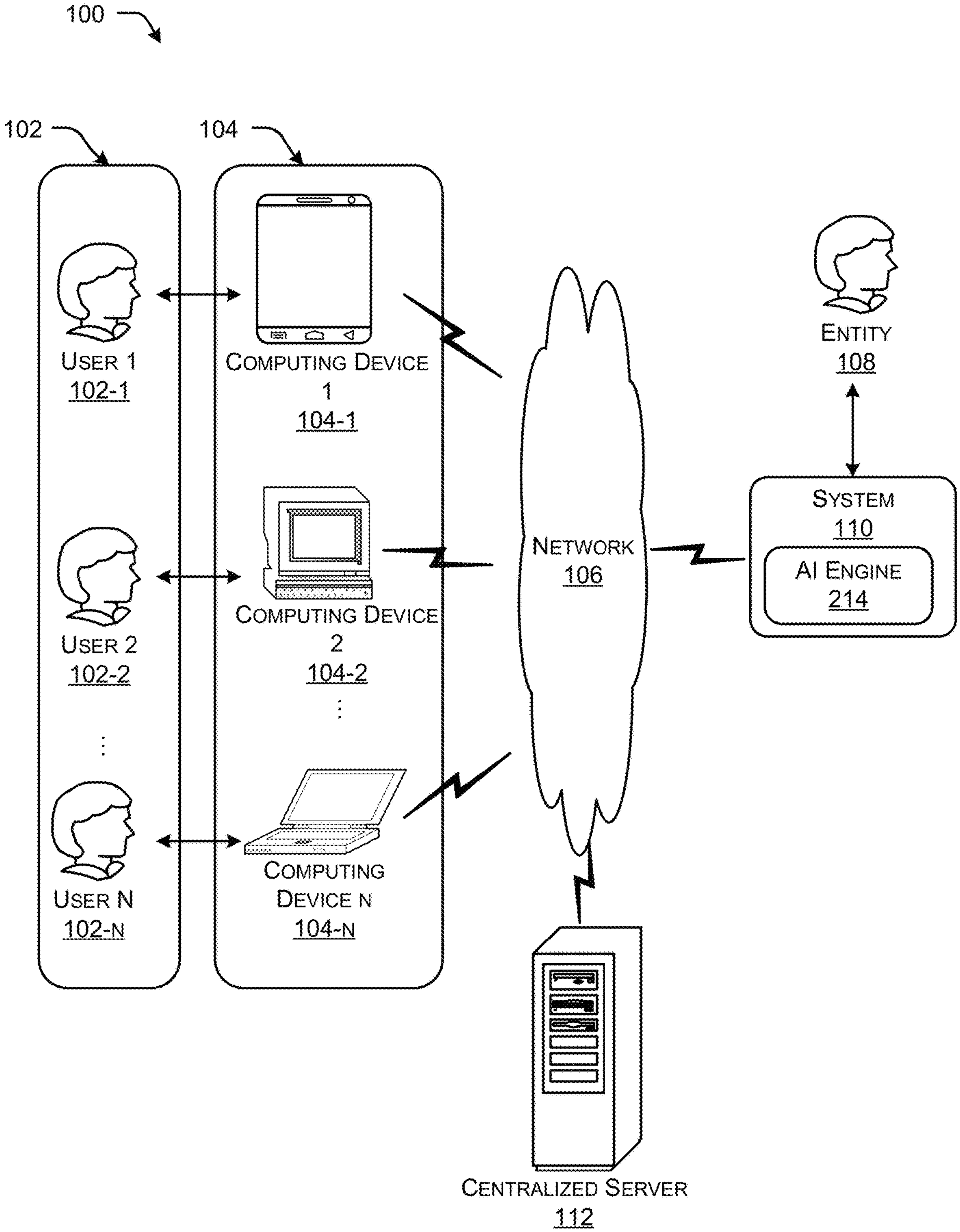
FIG. 1 illustrates an exemplary network architecture in which or with which the system of the present disclosure can be implemented for facilitating enhanced conference call, in accordance with an embodiment of the present disclosure.

The foregoing shall be more apparent from the following more detailed description of the disclosure.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a robust and effective solution to an entity or an organization by enabling the entity to implement a system for a team building process during an auction event. The disclosure may be generalized to consider any team sport auction and the framework designed may also be generalized. The system can facilitate an improved team quality and a bid success probability. The simulation platform consists of different scenarios for a user to help in the auction process based on a predefined set of parameters associated with different auction and sport specific constraints. At the same time, the system also considers the budget constraints and provides the user with controls to lock players, roles or slots as per his/her requirement. Thus, the system and method of the present disclosure may be beneficial for entities, organizations, and users.

Referring to FIG. 1 that illustrates an exemplary network architecture (100) in which or with which system (110) of the present disclosure can be implemented, in accordance with an embodiment of the present disclosure. As illustrated in FIG. 1, by way of example and not by way of limitation, the exemplary architecture (100) may include a plurality of first users (102-1, 102-2 . . . 102-N) (collectively referred to as participants (102) or bidders (102) or first users (102) and individually as participant (102) or first user (102) or bidder (102)) associated with a plurality of user computing devices (104-1, 104-2, . . . 104-N) (also referred to as user devices (104) or computing devices (104) collectively and user device (104) individually), at least a network (106), at least a centralized server (112), and an entity (108). More specifically, the exemplary architecture (100) includes a system (110) equipped with an artificial intelligence (AI) engine (214) for enhancing features required for detecting the top active participants (102). The user device (104) may be communicably coupled to the centralized server (112) through the network (106) to facilitate communication therewith. As an example, and not by way of limitation, the user device (104) may be operatively coupled to the centralised server (112) through the network (106) and may be associated with the entity (108). The system (110) may receive a set of data packets from the computing devices (104) associated with respective bidders (102). The AI engine (214) operatively coupled to the system (110) may receive a plurality of first set of data packets from the computing devices (104), the plurality of data packets pertaining to information associated with one or more entities. The one or more entities may include robot, humanoid or a set of players of a particular sport. The AI engine (214) may be configured to extract a first set of attributions from the plurality of data packets, the first set of attributes pertaining to quality of an entity or player. The system (110) may extract a second set of attributes from a knowledgebase pertaining to bidding parameters, the second set of attributes pertaining to probability of bid success. The system (110) may further extract a third set of attributes from the knowledge base, pertaining to budget and other associated parameters.

Based on the extracted first, second, and third set of attributes, the system (110) may determine or select the one or more entities to form a group associated with a sport. The AI engine (214) may use, but not limited to, a Genetic Algorithm (GA) to determine or optimize the selection of one or more entities or players. The system (110) may further determine a score for each entity or player in a predefined range such as a scaled number weight between 0 and 1 to the conflicting objectives of team quality and probability of bid success and whose sum has to be equal to 1.

In an embodiment, the user device (104) may communicate with the system (110) via a set of executable instructions residing on any operating system. In an embodiment, the user device (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the user device (104) may include one or more in-built or externally coupled accessories including, but not limited to, a visual aid device such as camera, audio aid, a microphone, a keyboard, input devices for receiving input from a user (102) such as touch pad, touch enabled screen, electronic pen and the like. It may be appreciated that the user device (104) may not be restricted to the mentioned devices and various other devices may be used. A smart computing device may be one of the appropriate systems for storing data and other private/sensitive information.

In an embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (106) may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
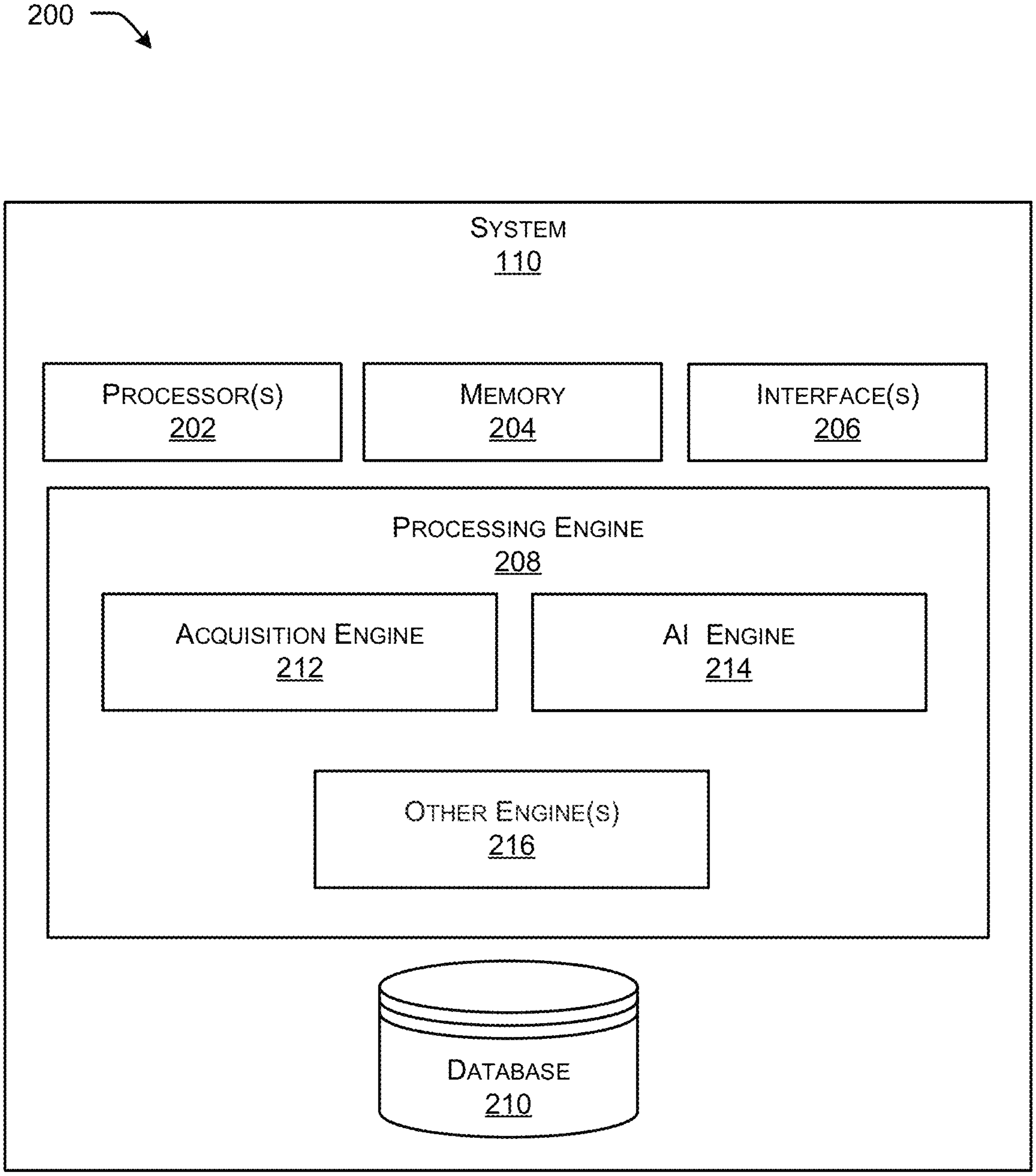
FIG. 2 illustrates an exemplary representation of system based on an artificial intelligence (AI) based architecture, in accordance with an embodiment of the present disclosure.

In an embodiment, the system (110) may include one or more processors coupled with a memory, wherein the memory may store instructions which when executed by the one or more processors may cause the system (110) to facilitate selection of entity or players. FIG. 2 with reference to FIG. 1, illustrates an exemplary representation of system (110) based on an AI based architecture, in accordance with an embodiment of the present disclosure. Referring to FIG. 2, in an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing engine(s) (208) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a data acquisition engine (212), an AI engine (214), and other engines (216) such as an auction engine, a decision maker engine, and the like. In an embodiment, the one or more processor(s) (202) of the system (110) may cause the acquisition engine (212) to extract a set of data parameters from the database (210) for enabling optimized team selection for a sport by the AI engine (214) along with other engines (216). In particular, the set of data parameters gained from user input along with the set of parameters from the database (210) may be analyzed as a whole to arrive at the estimation. In an embodiment, the one or more processor(s) (202) may cause the AI engine (214) to pre-process the set of data parameters in one or more batches. As described with reference to FIG. 1 above, the AI engine (214) may utilise one or more machine learning models to pre-process the set of data parameters. In an embodiment, the AI engine (214) may perform pre-processing of the set of data parameters to form data in a proper time-series with equal intervals of time, for example, intervals of 1 minute. In an embodiment, results of the pre-processing or analysis may thereafter be transmitted back to the computing device (104), to other devices, to a server providing a web page to a user (102) of the computing device (104), or to other non-device entities.

In an embodiment, based on the pre-processing, the one or more processor(s) (202) may cause the AI engine(s) (214) to estimate an optimized team of entity or players for a particular sport.

A person of ordinary skill in the art will appreciate that the exemplary representation (200) may be modular and flexible to accommodate any kind of changes in the system (110). In an embodiment, the data may get collected meticulously and deposited in a cloud-based data lake to be processed to extract actionable insights. Therefore, the aspect of predictive maintenance can be accomplished.

Figure 3:
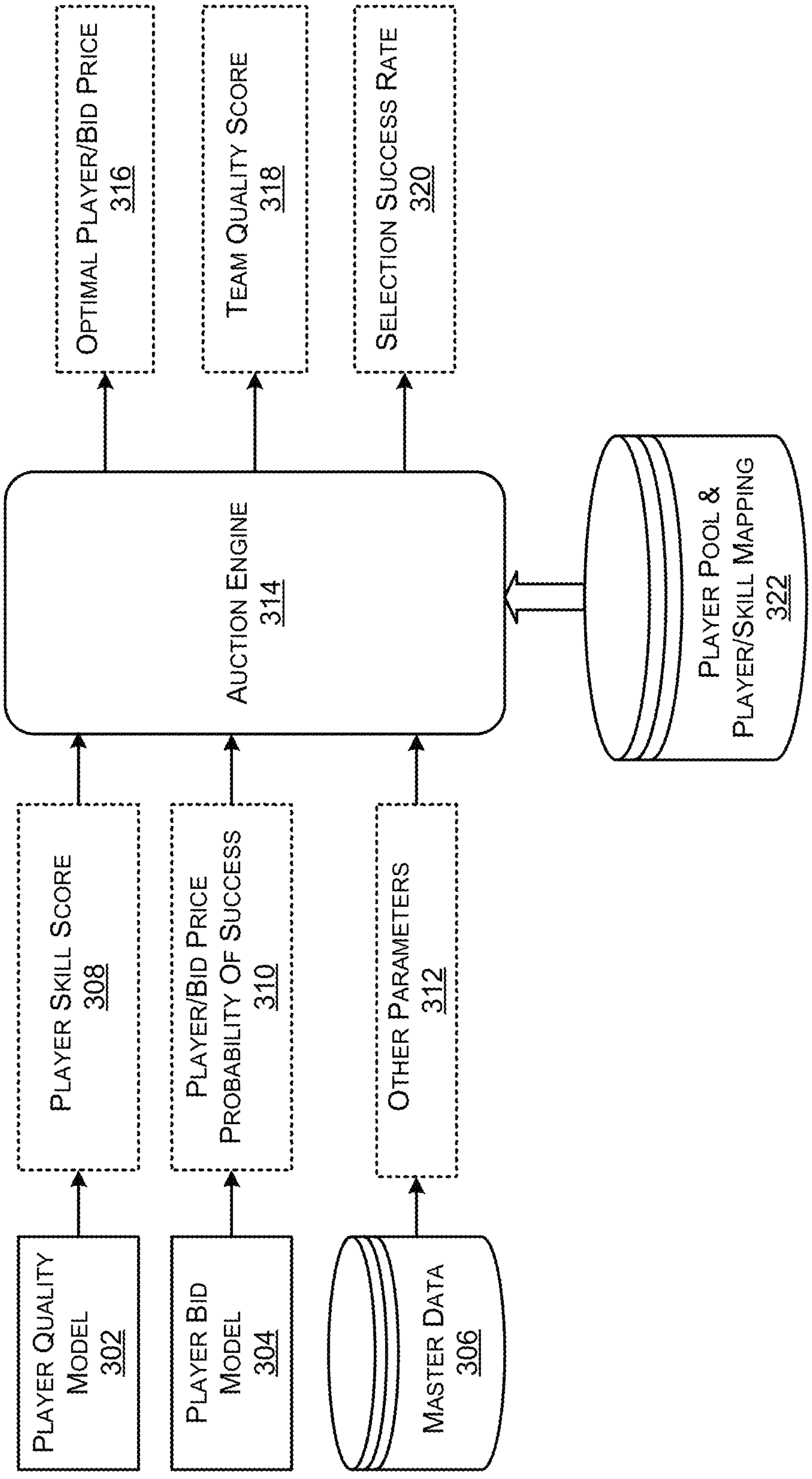
FIG. 3 illustrates exemplary system architecture having an auction engine (300), in accordance with an embodiment of the present disclosure.

FIG. 3 illustrates exemplary system architecture having an auction engine (300), in accordance with an embodiment of the present disclosure. An auction engine (314) at the back end may use Genetic Algorithm based optimizer to solve a multi-objective problem with constraints. One or more Inputs to the Auction engine are: Player Quality Score (302), (308) at a particular role 'R' and slot 'S', Player probability of bid success (304, 310) at different discrete bid prices, Constraints and parameters specific to the sport or the auction process (306, 312) for example: Budget constraint, Maximum players for role constraint, Maximum number of foreign players in a squad and the like. The budget constraint may include the maximum cost that may be assigned for all the players in a team as a whole or a constraint related to a specific player, a player for a specific role in a particular group sport. In one example, in a game of cricket, the role may include such as, without limitations, batsman, wicket keeper, bowler, etc. In another example, in a game of football, the role may include a goal keeper. The auction engine (314) may extract information from a knowledgebase having player pool and player/skill mapping (322) and output optimal player/bid price (316), team quality score (318), and selection success rate (320). The team quality score (318) and bid success rate or selection success rate (320) are inversely correlated. For example, the sum of required team quality and probability of bid success is equal to 1.

Figure 4:
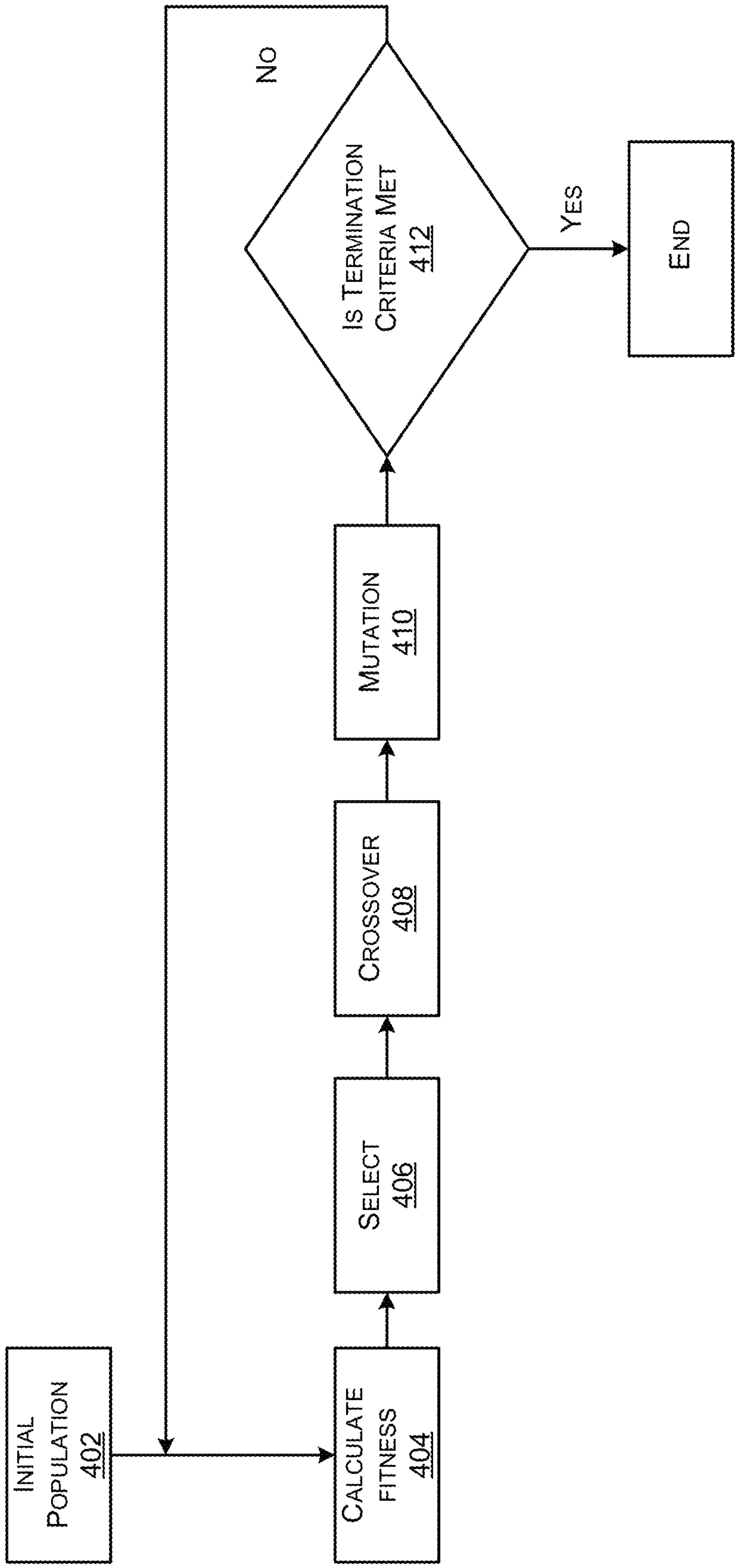
FIG. 4 illustrates an exemplary flow diagram depicting genetic algorithm, in accordance with an embodiment of the present disclosure.

FIG. 4 illustrates an exemplary flow diagram of a method (400) depicting genetic algorithm, in accordance with an embodiment of the present disclosure. As illustrated, by way of example and not as a limitation, the auction engine (314) shown in FIG. 3 may include a genetic algorithm at the back end. The genetic algorithm (GA) may include, at step (402), generating an initial population of N chromosomes and analysing the feasibility of the chromosome (inputs) based on the constraints, wherein the constraints include, but not limited to, budget constraint, maximum players for role constraint, maximum number of foreign players in a squad, and the like. At step (404), the GA may include evaluating the fitness f(n) of each chromosome n of the population N and creating a new generation, i.e. a new population by repeating the steps 406-410 until the termination criteria at step (412) is met. At step (406), the GA may include selecting two parent chromosomes from a population according to their fitness. The selection of parent chromosomes may use methods such as, without limitations, Roulette wheel and weighted ranking techniques. The general idea is that the chromosome that has a high fitness value, has a higher chance of getting selected. The selection process further includes analysing the feasibility of the chromosome (inputs) based on the above mentioned constraints. At step (408), the GA may include applying a crossover function, cross(p,q) that takes two chromosomes p and q (denoted as parent chromosomes) as inputs and generating a new set of off springs (children) chromosomes. The general idea is that the children chromosomes have inherited the properties from the parent chromosomes. The step (408) further includes analysing the feasibility of the chromosome (inputs) based on the constraints as mentioned above. Further, at step (410), the GA may include applying a mutation function, mutate(k) that takes a chromosome k as input and adds random noise such as, without limitations, Pseudo random noise, to the input features to generate a new chromosome. The noise helps in capturing the variability of the input space, enabling generalization of the method, and concentrate on a global solution instead of a local one. The step (410) further includes analysing the feasibility of the chromosome (inputs) based on the constraints as discussed above. The feasible children chromosomes (off springs) are added to the 'new' population and the newly generated population is henceforth used in the algorithm in an iterative manner. At step (412), a check is made whether a terminating condition is satisfied. If the terminating condition is satisfied, the GA stops and returns the best solution in current population. The terminating condition depends on how the average quality of the population changes with a generation, for example, the terminating condition may include, but not limited to, Time limit and Maximum number of iterations.

If the termination condition is not met, the new population goes to step (404) where the GA calculates the fitness associated with the new population.

Figure 5A:
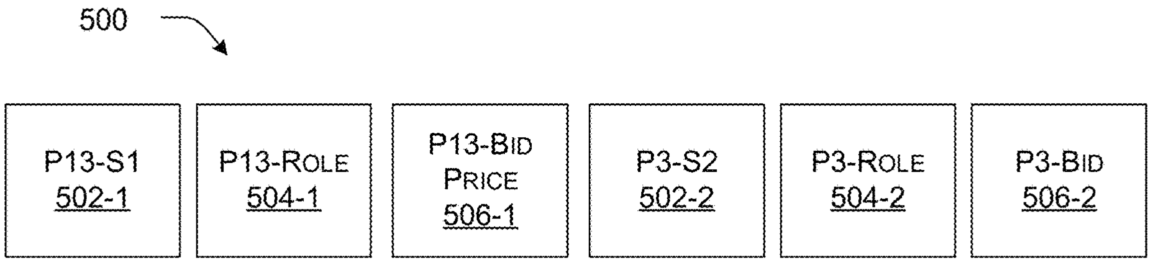
FIGS. 5A-5C illustrate exemplary block diagrams depicting an example chromosome, crossover, and mutation, in accordance with embodiments of the present disclosure.
Figure 5B:
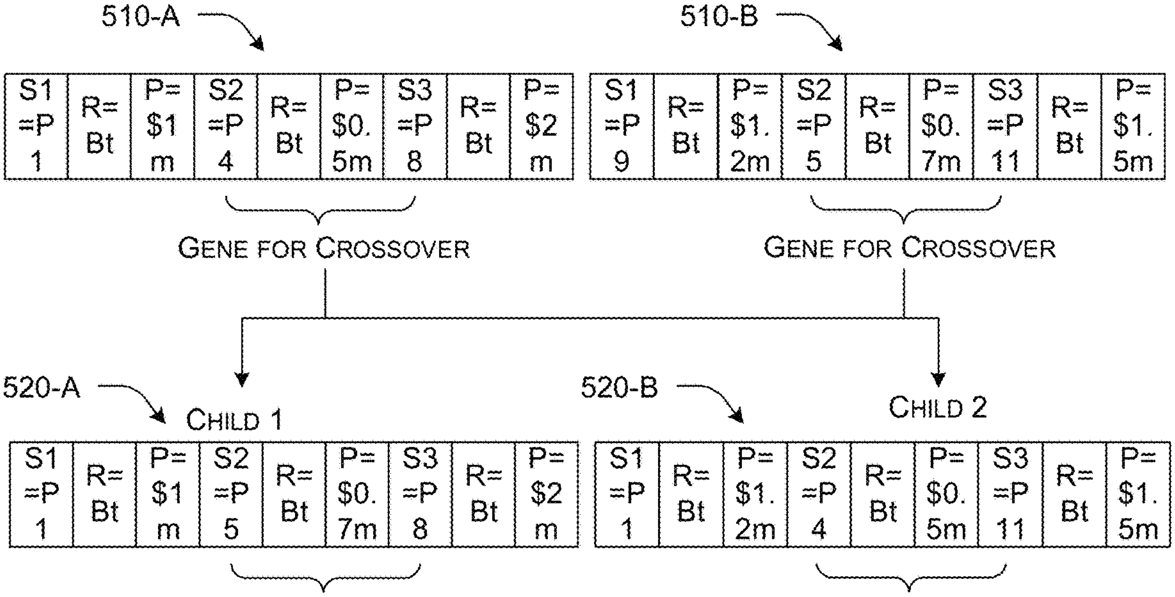
Figure 5C:
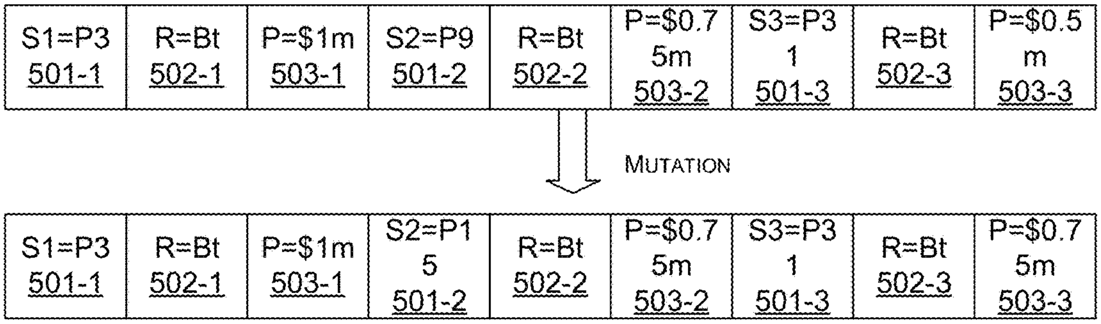

FIGS. 5A-5C illustrate exemplary block diagrams depicting an example of chromosomes used by the genetic algorithm described above in FIG. 4, crossover of the chromosomes, and mutation of the chromosomes, respectively, in accordance with embodiments of the present disclosure. Referring to FIG. 5A, a chromosome (500) is shown. The chromosome (500) includes details related to which players should be selected, the slot, role and the bid price. As illustrated, in FIG. 5A, in an aspect, there can be at least three categories of genes which are ordered pairs. The first gene is the slot (502-1, 502-2), the second gene is the role (504-1, 504-2) for the player, and the third gene is the bid price (506-1, 506-2) of the player. In an exemplary embodiment, the size of the chromosome would be No. of players*3.

In an exemplary embodiment, a fitness function is used for evaluating the score chromosome. The Fitness function is given by Maximize=Team Quality Weight*AverageTeamQuality+ProbabilityOfSuccess Weight*AverageTeamProbabilityOfSuccess FIG. 5B illustrates an example of gene crossover where unique gene sequences from two parent chromosomes (501-A, 510-B) are used to construct children chromosomes (520-A, 520-B).

FIG. 5C illustrates an example of gene mutation. FIG. 5C shows a mutation step where random number of genes in a chromosome are randomly mutated. For example, in FIG. 5C the genes present in slots (501-2 and 503-3) are shown to be changed randomly.

Figures 6A, 6B:
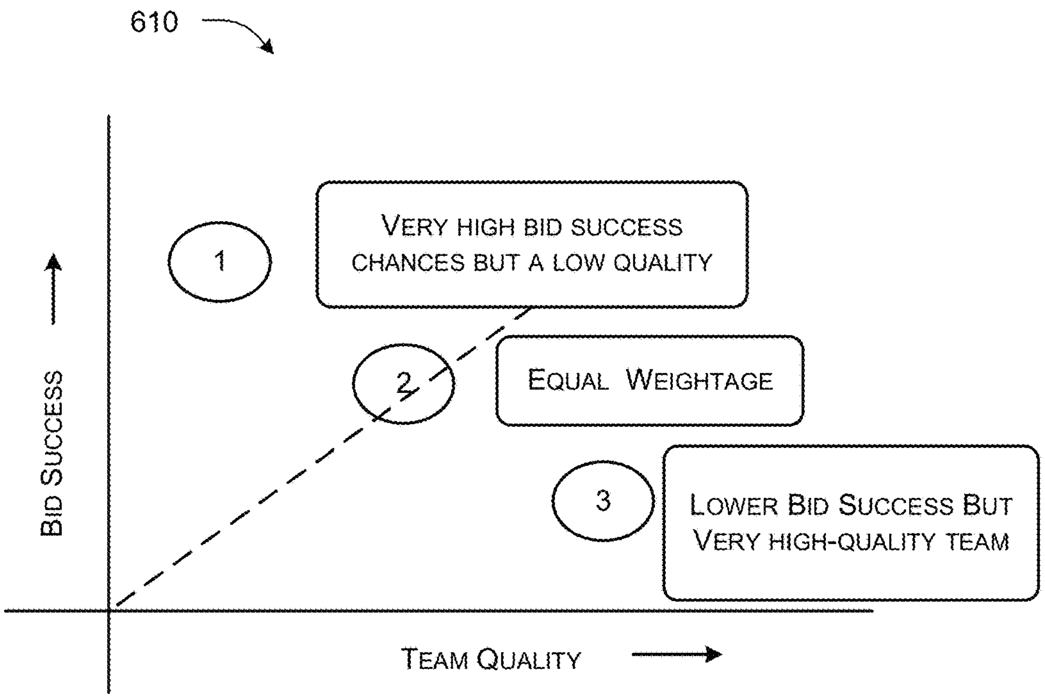

FIGS. 6A-6E illustrate various implementations and scenarios of exemplary GA, in accordance with embodiments of the present disclosure. FIG. 6A shows an example implementation of a first scenario (600), wherein the first scenario includes two inputs namely 1. Team quality weight and 2. Bid success weight. Team quality weight and bid success weight are inversely correlated i.e., higher the team quality weight, the lower the weight for bid. Keeping the constraints fixed, the GA provides a team squad as output with the player, role, and his/her bid price. In FIG. 6A, three different combinations of input (602-1, 602-2, 602-3) i.e., various combinations of the team quality value and the bid success value along with their corresponding output (604-1, 604-2, 604-3) is shown. Referring to FIG. 6A, when the input (602-1) with a team quality value of 0.1 and bid success of 0.9 is given then a team as shown in the output (604-1) will be the selected team. Similarly, for the other inputs (602-2, 602-3) teams shown in their respective outputs (604-2-604-3) will be selected. FIG. 6B illustrates a graphical representation 610 of the first scenario. As shown in FIG. 6B, very high bid success chance ends up with a low-quality team (1) and on the other extreme a very high quality team will have a lower bid success rate (3). The role of the GA optimizer is to provide a team having equal weightage (2).

FIG. 6C illustrates a second Scenario, where the inputs are

Team quality weight,
Bid success weight, and
Players which have to be included in the squad.

In FIG. 6C, the table 620 shows the freezing of players who need to be included in the team.

The GA optimizer subsequently provides the role, slot and the bid prices for the frozen players and also suggests slots, role and optimal bid prices for other non-frozen players in the squad.

FIG. 6D illustrates a third scenario, where the inputs are:

Team quality weight,
Bid success weight,
Players or entities which must be included in the group or squad, and
Bid prices for the players or entities to be included in the group or squad.

As shown in FIG. 6D, table (630), the players, and their respective bid prices are fixed. The GA optimizer provides the role and slot of these fixed players. Further, the GA optimizer selects other players in the squad or team and provides role, slot, and optimal bid price for the other players. Further, the GA optimizer selects the other players in the squad based on the team quality and probability of bid success.

FIG. 6E illustrates a fourth scenario, where the inputs are:

Team quality weight,
Bid success weight,
Players which have to be included in the squad, and
Bid prices for the players to be included in the squad In FIG. 6E, table (640) shows the fourth scenario where the player, the bid price, and the slot is frozen and the role is left for the model to determine. Further, the GA optimizer determines the other players of the squad and their respective slot, role, and bid prices.

In one exemplary embodiment, instead of the slot, the role can be frozen for the fixed players and the GA optimizer selects a slot for the fixed players. Further, the GA optimizer determines the other players of the squad and their respective slot, role, and bid prices.

Figure 7A:
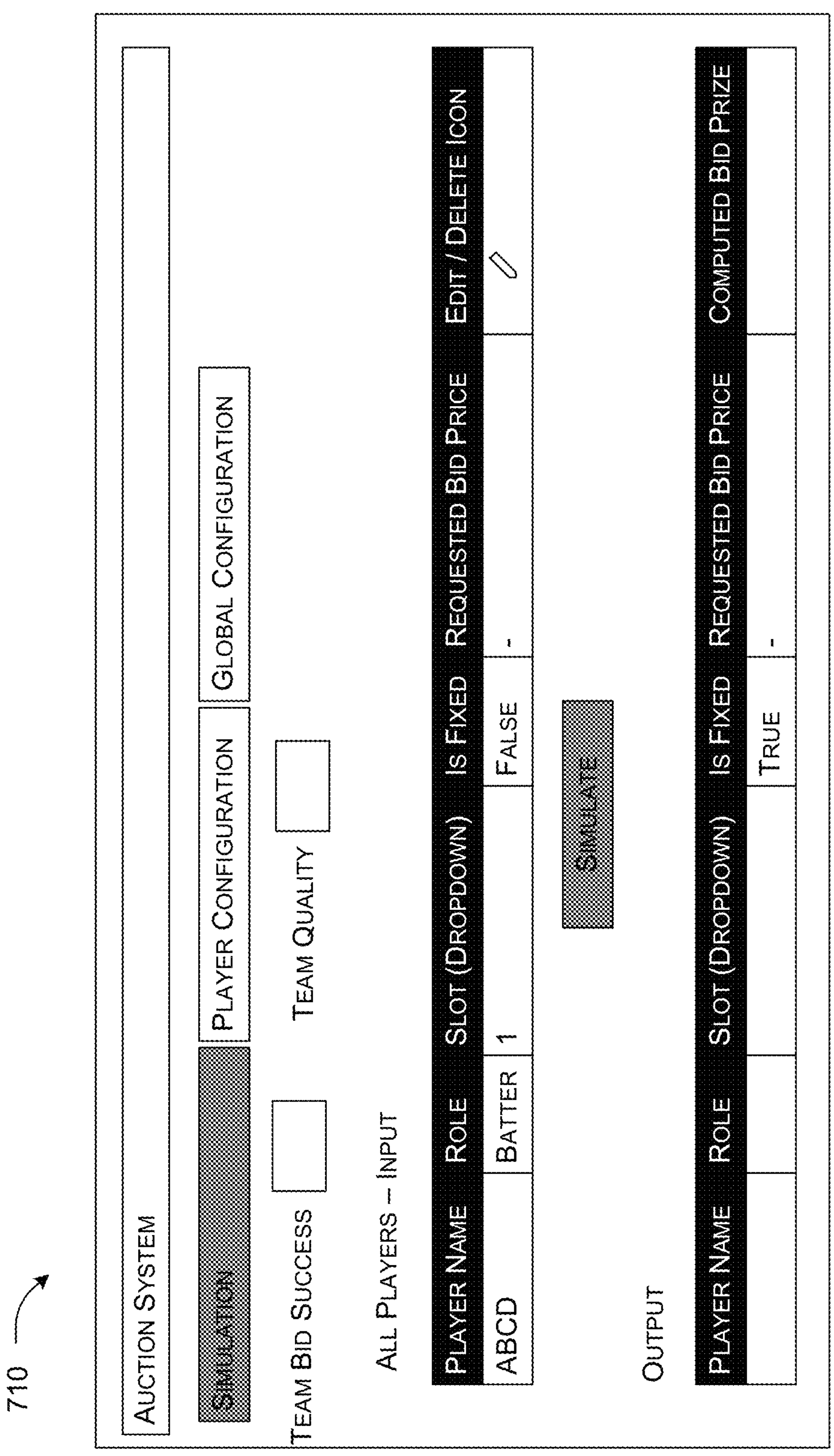
FIGS. 7A-7C illustrate exemplary representation of user interface (UI) screens, in accordance with embodiments of the present disclosure.
Figure 7B:
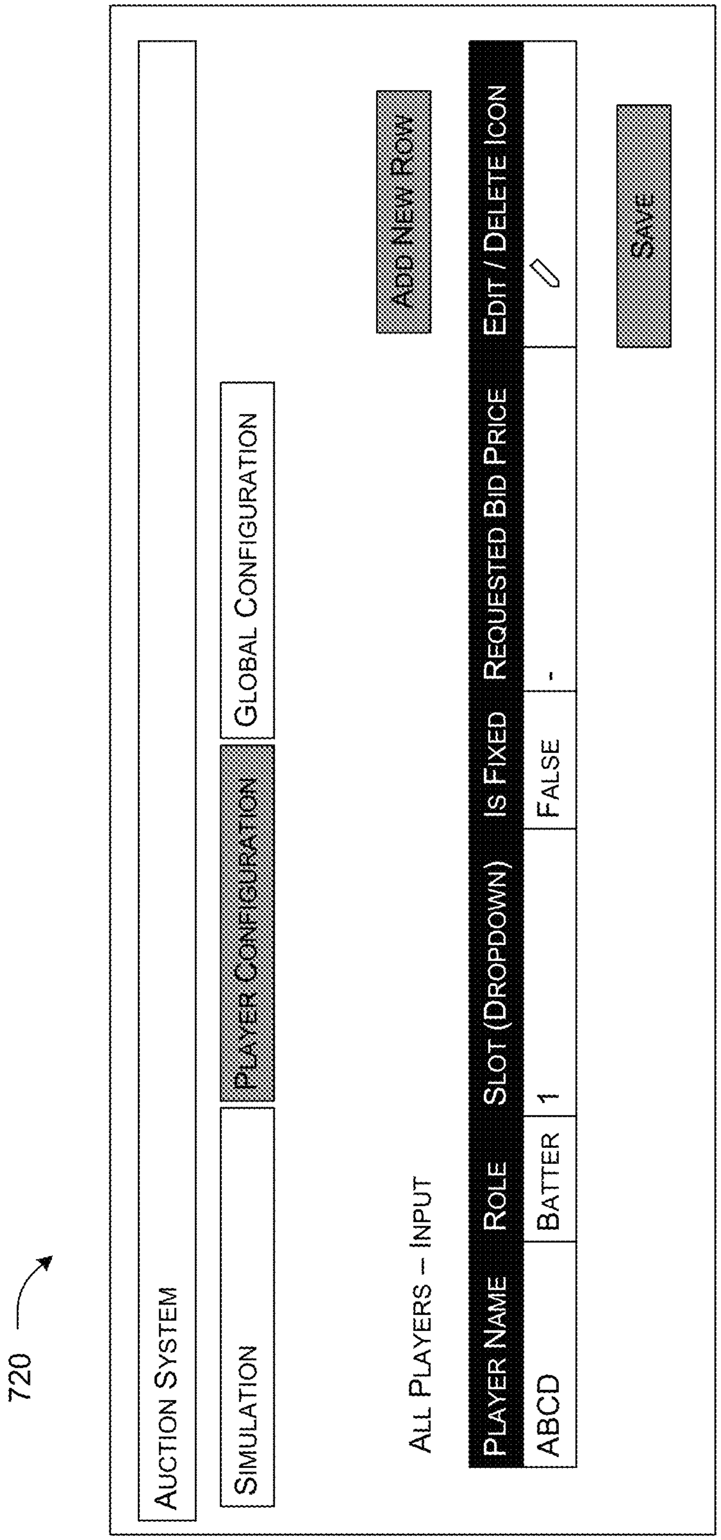
Figure 7C:
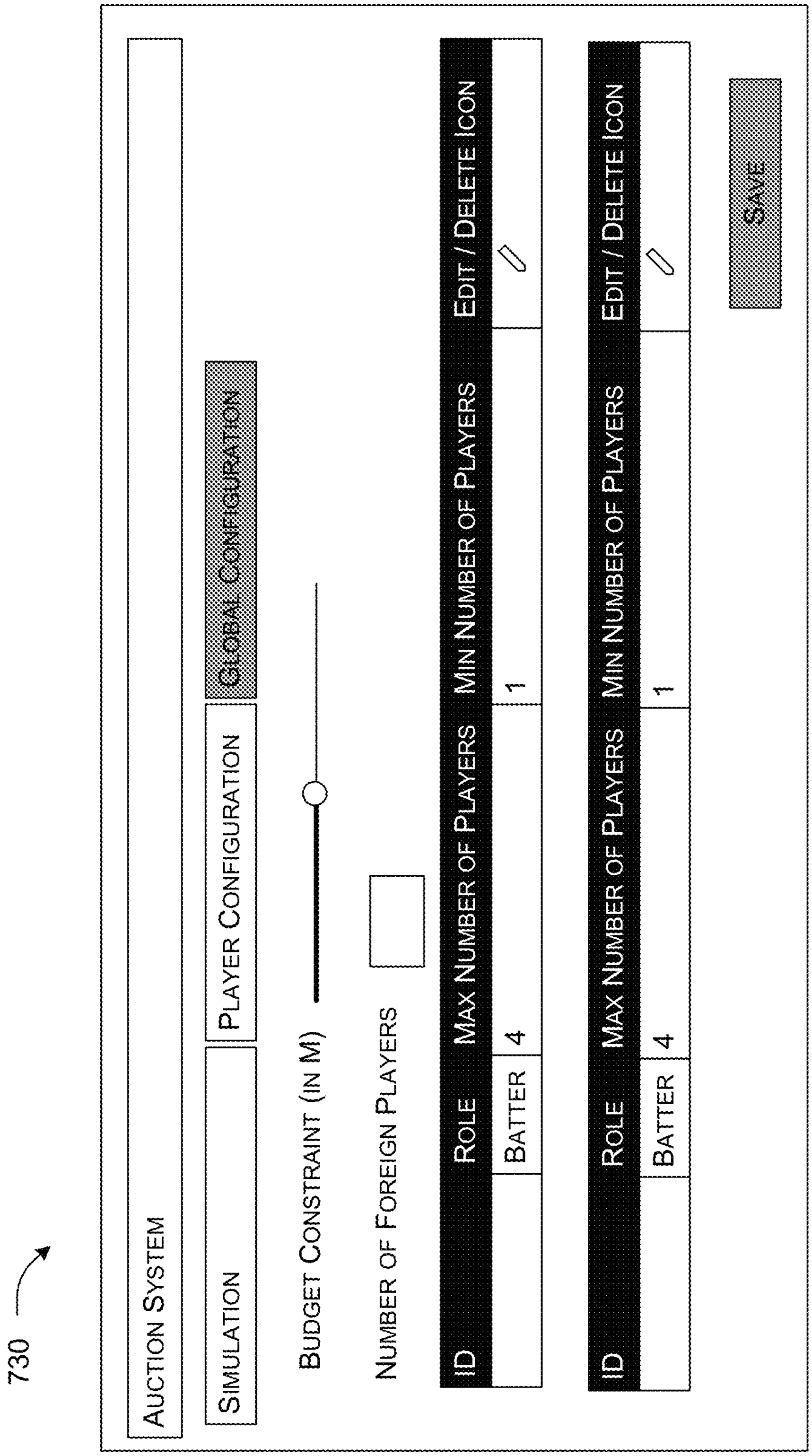

FIGS. 7A-7C illustrate exemplary representation of user interface (UI) screens. As illustrated, the UI screen consists of the three tabs namely, simulation tab, player configuration selection tab, and global configuration selection tab. In FIG.

7A, the UI screen (710) related to selecting the simulation tab is shown. The screen displays interfaces to enter inputs such as, the team bid success value and the team quality value. The interface also enables fixing of players, their bid price, role or the slot. The output is displayed on the screen after the 'Simulate' button is pressed. In FIG. 7B, the UI screen (720) related to selecting the player configuration tab is shown. The player configuration tab allows the user (102) to change the parameters of certain players in the pool. In FIG. 7C, the UI screen (730) related to selecting the global configuration tab is shown. The global configuration tab provides of different constraint inputs for example, budget, number of foreign player and other parameters needed for the simulation.

Figure 8:
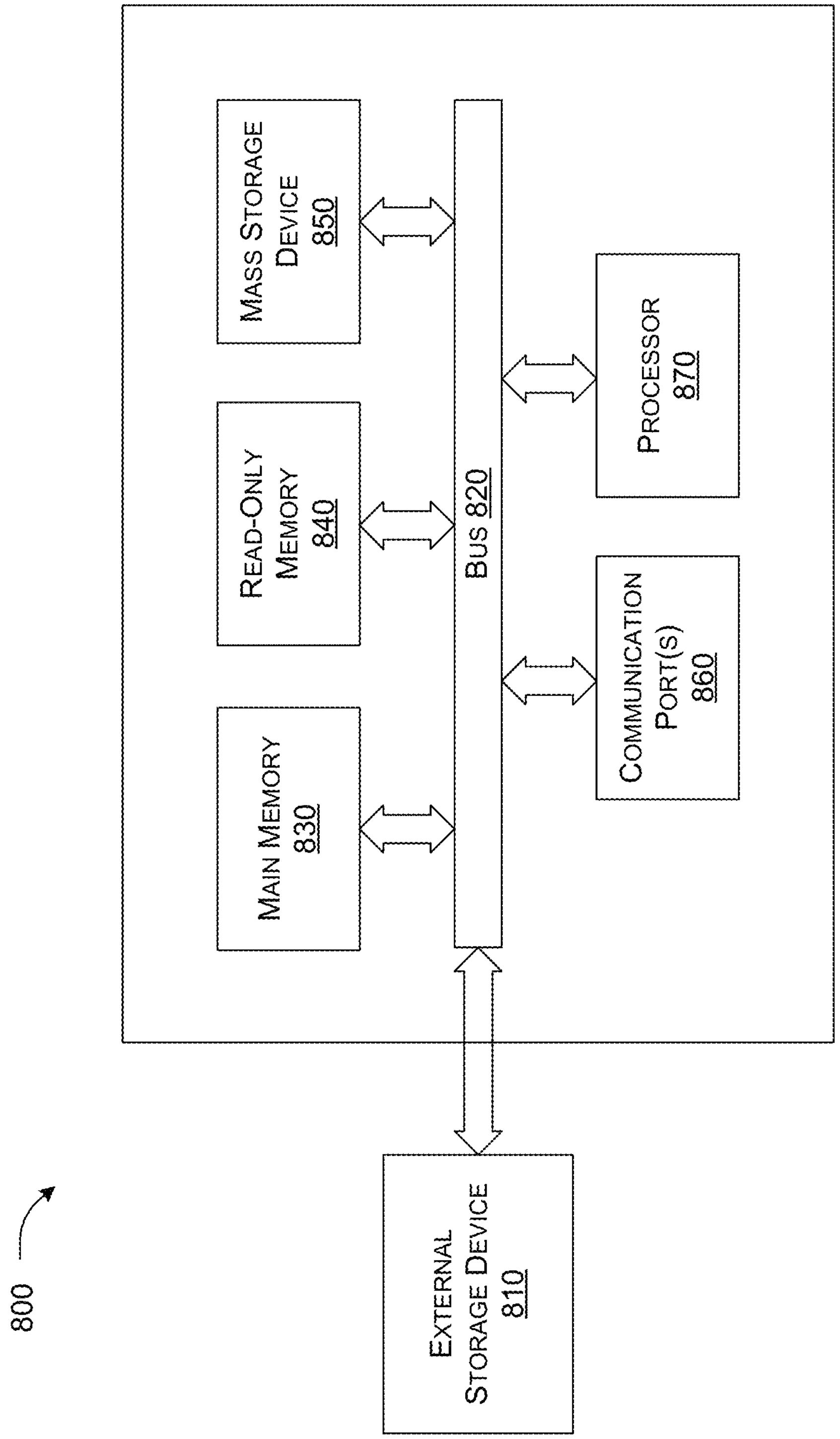
FIG. 8 illustrates an exemplary computer system in which or with which embodiments of the present disclosure may be utilized.

FIG. 8 illustrates an exemplary computer system (800) in which or with which embodiments of the present disclosure may be utilized, in accordance with embodiments of the present disclosure. As shown in FIG. 8, the computer system (800) may include an external storage device (810), a bus (820), a main memory (830), a read only memory (840), a mass storage device (850), communication port(s) (860), and a processor (870). A person skilled in the art will appreciate that the computer system (800) may include more than one processor (870) and communication port(s) (860). The processor (870) may include various modules associated with embodiments of the present disclosure. The communication port(s) (860) may be any of an RS-232 port for use with a modem based dialup connection, a 10/100 Ethernet port, a Gigabit or 10 Gigabit port using copper or fiber, a serial port, a parallel port, or other existing or future ports. The communication port(s) (860) may be chosen depending on a network, such a Local Area Network (LAN), Wide Area Network (WAN), or any network to which computer system connects. The main memory (830) may be Random Access Memory (RAM), or any other dynamic storage device commonly known in the art. The read-only memory (840) may be any static storage device(s) e.g., but not limited to, a Programmable Read Only Memory (PROM) chips for storing static information e.g., start-up or BIOS instructions for the processor (870). The mass storage device (850) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

The bus (820) communicatively couples the processor (870) with the other memory, storage, and communication blocks. The bus (820) may be, e.g. a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects the processor (870) to the computer system (800).

Optionally, operator and administrative interfaces, e.g. a display, keyboard, and a cursor control device, may also be coupled to the bus (820) to support direct operator interaction with the computer system (800). Other operator and administrative interfaces may be provided through network connections connected through the communication port(s) (860). Components described above are meant only to exemplify various possibilities. In no way should the aforementioned exemplary computer system (800) limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT INVENTION

The present disclosure enables taking informed decisions during an auction using the various parameters mentioned.

The present disclosure provides an efficient solution quickly which is often crucial in the auction process.

The present disclosure provides a decision maker with multiple scenario simulations and thus preparing him/her for a wide range of possibilities arising in the auction process.

We claim:

1. A system for selecting entities, said system comprising:

one or more processors; and a memory operatively coupled to the one or more processors, wherein the memory comprises processor-executable instructions, which on execution, cause the one or more processors to:

receive a first input associated with a quality of a group associated with a sport;

receive a second input associated with a success probability of a bid associated with the group;

determine an optimized list of entities to form the group by applying a genetic algorithm that simultaneously optimizes entity selection based on both the quality of the group and the success probability of the bid, wherein the quality of the group and the success probability of the bid are inversely correlated; and select the entities based on the optimized list to play the sport.

2. The system as claimed in claim 1, wherein the memory comprises processor-executable instructions, which on execution, cause the one or more processors to determine the optimized list of entities based on one or more conditions.

3. The system as claimed in claim 1, wherein the entities comprise at least one of: human, robot, and humanoids.

4. The system as claimed in claim 2, wherein the one or more conditions comprise at least one of: a budget, a maximum number of the entities for a role, and a maximum number of different types of the entities.

5. The system as claimed in claim 1, wherein the memory comprises processor-executable instructions, which on execution, cause the one or more processors to determine the optimized list of entities based on at least one of:

a team quality weight;

a bid success weight;

a list of pre-included entities;

bid prices for the pre-included entities; and a slot or a role associated with the pre-included entities.

6. The system as claimed in claim 5, wherein the optimized list of entities forming the group comprises the list of pre-included entities.

7. The system as claimed in claim 1, wherein the memory comprises processor-executable instructions, which on execution, cause the one or more processors to display the optimized list of entities on a user interface (UI).

* * * * *